(12) United States Patent
Lee et al.

(10) Patent No.: US 11,718,205 B2
(45) Date of Patent: Aug. 8, 2023

(54) WALK-IN DEVICE FOR SEAT

(71) Applicant: DAS CO., LTD., Gyeongju-si (KR)

(72) Inventors: Dong Man Lee, Suwon-si (KR); Seung Heon Ryu, Yongin-si (KR)

(73) Assignee: DAS CO., LTD., Gyeongju-si (KR)

( * ) Notice: Subject to any disclaimer, the term of this patent is extended or adjusted under 35 U.S.C. 154(b) by 51 days.

(21) Appl. No.: 17/585,700

(22) Filed: Jan. 27, 2022

(65) Prior Publication Data

US 2022/0379776 A1 Dec. 1, 2022

(30) Foreign Application Priority Data

Jun. 1, 2021 (KR) .................. 10-2021-0070916

(51) Int. Cl.
*B60N 2/20* (2006.01)
*B60N 2/30* (2006.01)

(52) U.S. Cl.
CPC .............. *B60N 2/20* (2013.01); *B60N 2/3011* (2013.01)

(58) Field of Classification Search
CPC ... B60N 2/20; B60N 2/12; B60N 2/14; B60N 2/10; B60N 2/1695; B60N 2/3011
USPC ....... 297/378.1, 311, 313, 463.1, 344.1, 317, 297/324, 344.14
See application file for complete search history.

(56) References Cited

U.S. PATENT DOCUMENTS

| | | | | |
|---|---|---|---|---|
| 6,354,553 | B1* | 3/2002 | Lagerweij | B60N 2/0806 297/344.1 |
| 6,405,987 | B1* | 6/2002 | Andrigo | B60N 2/0705 248/429 |
| 10,596,928 | B2* | 3/2020 | Pleskot | B60N 2/10 |
| 2009/0230752 | A1* | 9/2009 | Adragna | B60N 2/164 403/24 |
| 2011/0210586 | A1* | 9/2011 | Masutani | B60N 2/42763 297/216.1 |
| 2014/0361592 | A1* | 12/2014 | Kuno | B60N 2/1825 297/325 |
| 2018/0272896 | A1* | 9/2018 | Park | B60N 2/233 |
| 2018/0361882 | A1* | 12/2018 | Ikeda | B60N 2/12 |
| 2019/0152352 | A1* | 5/2019 | Handigol | B60N 2/1615 |
| 2019/0225120 | A1* | 7/2019 | Kish | B60N 2/43 |
| 2020/0055428 | A1* | 2/2020 | Kakishima | B60N 2/50 |
| 2020/0101870 | A1* | 4/2020 | Aktas | B60N 2/0806 |

(Continued)

FOREIGN PATENT DOCUMENTS

| | | |
|---|---|---|
| KR | 101934699 B1 | 1/2019 |
| WO | 2015/028243 A1 | 3/2015 |

*Primary Examiner* — Mark R Wendell
(74) *Attorney, Agent, or Firm* — Bridgeway IP Law Group, PLLC; Jihun Kim

(57) ABSTRACT

Disclosed herein is a walk-in device for a seat. The walk-in device includes: a rotor configured to operate in conjunction with a recliner during a walk-in operation; a puller configured to operate in conjunction with the rotor during the walk-in operation, and to operate only in conjunction with the recliner without operating in conjunction with the rotor during a folding operation; a rotor spring configured to provide an elastic force to the rotor in a return direction; a puller spring configured to provide an elastic force to the puller in a return direction; and a base plate configured to rotatably install the rotor and the puller on a cushion frame of the seat, wherein the rotor and the puller are configured to set up a single rotation point with respect to the base plate via a hinge shaft.

9 Claims, 9 Drawing Sheets

(56) References Cited

U.S. PATENT DOCUMENTS

| | | | |
|---|---|---|---|
| 2020/0156516 A1* | 5/2020 | Kakishima | B60N 2/34 |
| 2020/0215935 A1* | 7/2020 | Maekawa | B60N 2/20 |

* cited by examiner

WALK-IN DEVICE FOR SEAT

CROSS-REFERENCE TO RELATED APPLICATION

This application claims priority from and the benefit of Korean Patent Application No. 10-2021-0070916, filed on Jun. 1, 2021, which is hereby incorporated by reference for all purposes as if fully set forth herein.

BACKGROUND

1. Technical Field

The present invention relates to a walk-in device for a seat, and more particularly to a walk-in device for a seat that provides both folding and walk-in functions for a seat via a single hinge-type structure.

2. Description of the Related Art

In general, in the case of sport utility vehicles (SUVs) or vans in which seats are arranged in three rows, second-row seats are equipped with both walk-in and folding functions in order to help passengers get on or off third-row seats.

An example of conventional technology for implementing walk-in and folding functions for a second-row seat is a folding reclining device for a vehicle seat disclosed in Korean Patent No. 10-1241692.

In other words, in the conventional folding reclining device for a vehicle seat, configurations capable of implementing walk-in and folding functions are provided in a reclining unit and a folding unit and the folding function can also be performed with a recliner lever configured to perform a reclining function.

However, in the above-described conventional folding reclining device for a vehicle seat, the operation thereof is performed by two hinge structures, so that there is a limitation to reducing the space occupied by parts and ease of assembly is deteriorated and also it is difficult to reduce manufacturing costs due to an excessive number of parts.

SUMMARY

An object of the present invention is to provide a walk-in device for a seat that that provides both folding and walk-in functions for a seat via a single hinge-type structure, so that the space occupied by parts can be reduced and ease of assembly can be improved and also manufacturing costs can be reduced due to a reduction in the number of related parts.

In order to accomplish the above object, the present invention provides a walk-in device for a seat, the walk-in device including: a rotor configured to operate in conjunction with a recliner during a walk-in operation; a puller configured to operate in conjunction with the rotor during the walk-in operation, and to operate only in conjunction with the recliner without operating in conjunction with the rotor during a folding operation; a rotor spring configured to provide an elastic force to the rotor in a return direction; a puller spring configured to provide an elastic force to the puller in a return direction; and a base plate configured to rotatably install the rotor and the puller on a cushion frame of the seat, wherein the rotor and the puller are configured to set up a single rotation point with respect to the base plate via a hinge shaft.

The rotor may include: a pressure reception portion configured to receive a rotational force from the spring hooker of the recliner during the walk-in operation; a contact portion configured to perform a conjunctive operation through contact with the walk-in rod of the recliner during the folding operation; a protrusion portion configured to limit the rotation angle of the rotor through contact with the catch portion of the base plate during the walk-in operation; and an embossing portion configured to switch the track locker to a released state through a conjunctive operation with the puller during the walk-in operation.

The embossing portion may include a first embossing portion and a second embossing portion provided at respective portions that are radially spaced apart from the rotation center of the rotor in order to provide a rotational action force to the puller.

The rotor may further include a restraint protrusion portion configured to be inserted into the reception slit of the cushion frame during the walk-in operation and to limit the folding angle of a back frame through contact with the reception slit.

The puller may include: a pressure reception portion configured to operate in conjunction with the first embossing portion of the rotor during the walk-in operation; and a mounting portion connected to a walk-in cable to release the track locker during the walk-in operation.

The puller may further include a slot portion configured to accommodate the second embossing portion so that the embossing portion can be rotated by a set angle in order to allow the rotation of only the rotor during the folding operation.

The puller may further include a protrusion portion configured to support one end of the puller spring.

The puller spring may be installed such that both ends thereof are supported on the protrusion portion of the puller and the recess portion of the hinge shaft, respectively.

The rotor spring may be installed such that both ends thereof are supported on the contact portion of the rotor and the catch portion of the base plate, respectively.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
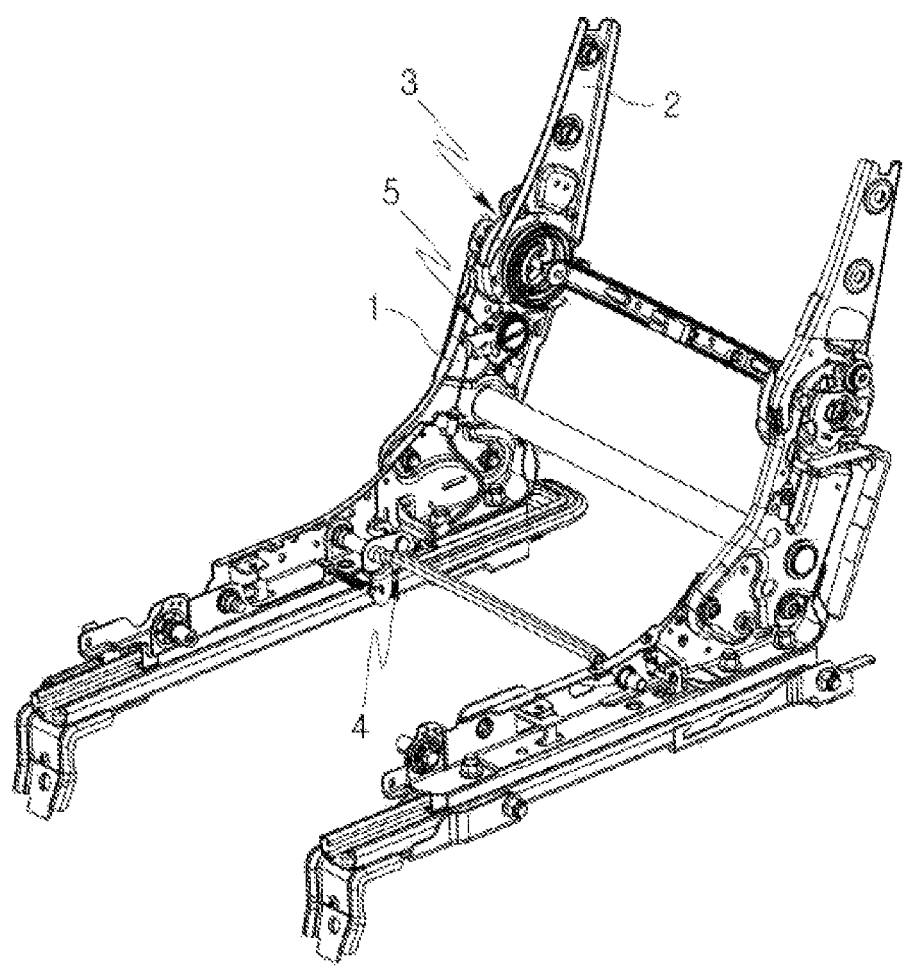
FIG. 1 is a perspective view showing the overall installation state of a walk-in device for a seat according to an embodiment of the present invention.

Preferred embodiments of the present invention will be described in detail below with reference to the accompanying exemplary drawings.

Referring to the drawings, a walk-in device for a seat according to an embodiment of the present invention is a single hinge-type structure using a release lever direct driving scheme, and is configured to provide both folding and walk-in functions for a seat.

To this end, the present invention includes: a recliner 3 configured to operate to variably adjust the inclination angle of a back frame 2 with respect to the cushion frame 1 of a seat; and a walk-in device 5 configured to control the operation of a track locker 4 to variably adjust the front-rear position of the seat with respect to the cushion frame 1. The walk-in device 5 is configured to operate in conjunction with the recliner 3.

In this case, the walk-in device 5 includes: a rotor 10 configured to limit the turning angle of the recliner 3 while operating in conjunction with the recliner 3 during a walk-in operation; a puller 20 configured to release the track locker 4 while operating in conjunction with the rotor 10 during a walk-in operation, and to operate only in conjunction with the recliner 3 without operating in conjunction with the rotor 10 during a folding operation; a rotor spring 30 installed to provide an elastic force to the rotor 10 in a return direction during a walk-in operation; a puller spring 40 installed to provide an elastic force to the puller 20 in a return direction during walk-in and folding operations; and a base plate 50 configured to rotatably install the rotor 10 and the puller 20 on the cushion frame 1 of the seat.

In this case, the rotor 10 and the puller 20 are configured to set up a single rotation point with respect to the base plate 50 via a hinge shaft 60.

In the walk-in device for a seat according to an embodiment of the present invention, the rotor 10 includes a pressure reception portion 11, a contact portion 12, a protrusion portion 13, embossing portions 14, and a constraint protrusion portion 15. Furthermore, the rotor 10 is provided with a through hole 10a configured to perform axial coupling with the hinge shaft 60 in the central portion thereof. As a result, the rotor 10 may set up the single rotation point with respect to the base plate 50 via the hinge shaft 60.

The pressure reception portion 11 receives a rotational force from the spring hooker 3a of the recliner 3 during a walk-in operation, and is configured to protrude radially outward from the rotor 10.

The contact portion 12 operates in conjunction with the recliner 3 through contact with the walk-in rod 3b of the recliner 3 during a folding operation, and is configured to protrude radially outward from the rotor 10.

Figure 4:
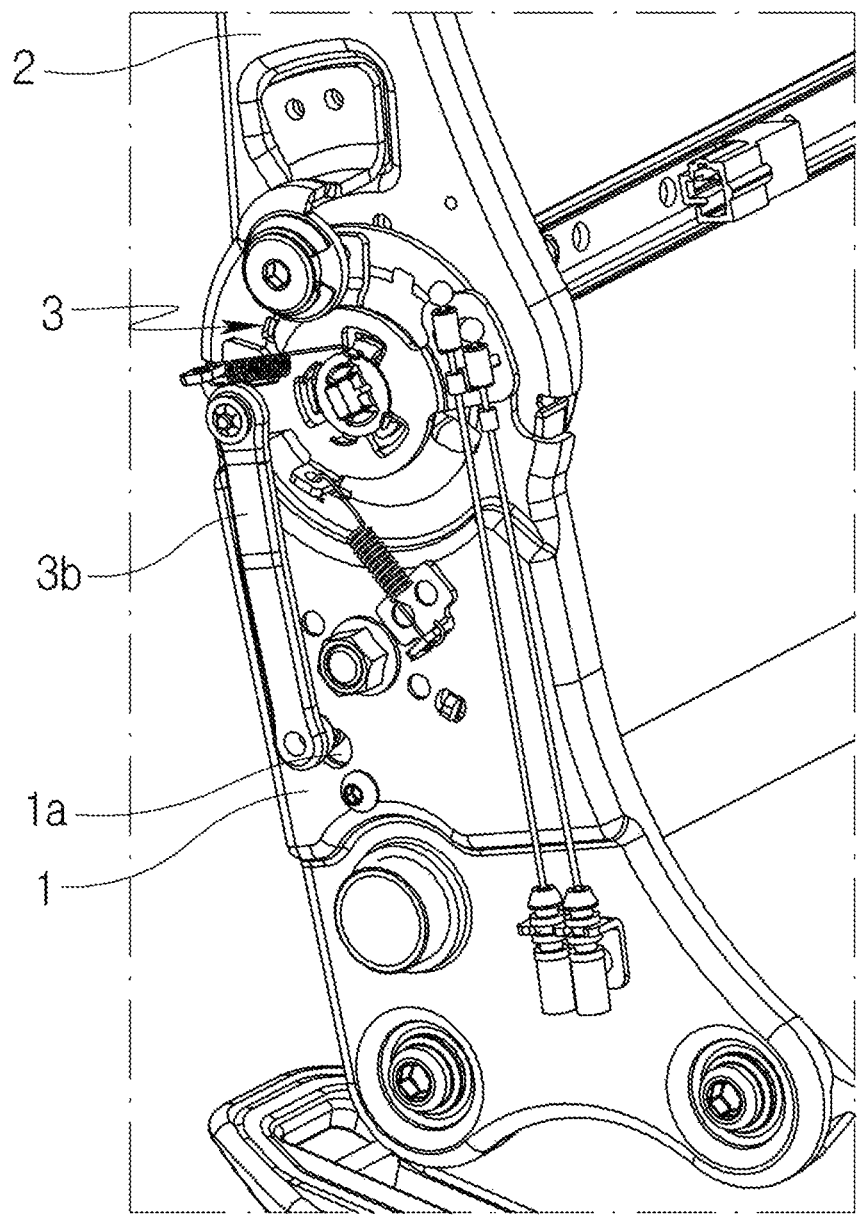
FIG. 4 is an enlarged perspective view of only the main portion of the present invention shown in FIG. 3.
Figure 5:
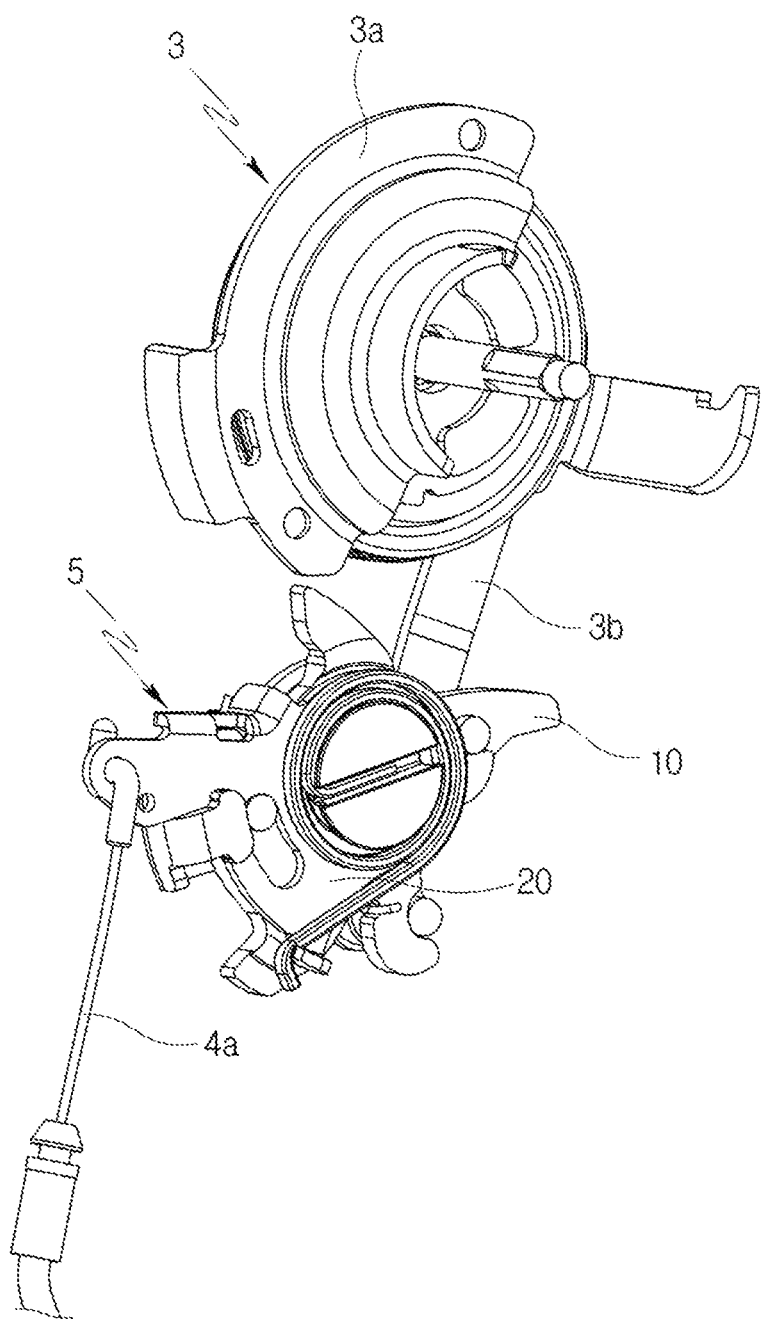
FIG. 5 is a perspective view showing only a recliner and a walk-in device corresponding to the main portion of the present invention separated from FIG. 1.
Figure 6:
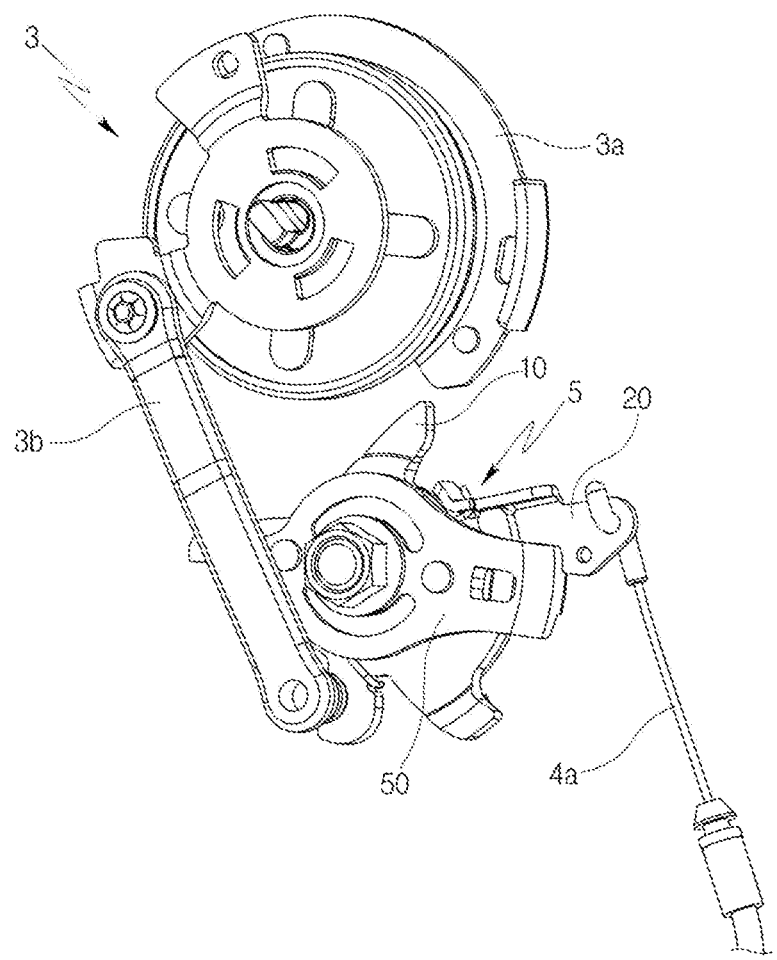
FIG. 6 is a perspective view showing only the recliner and the walk-in device corresponding to the main portion of the present invention.
Figure 7:
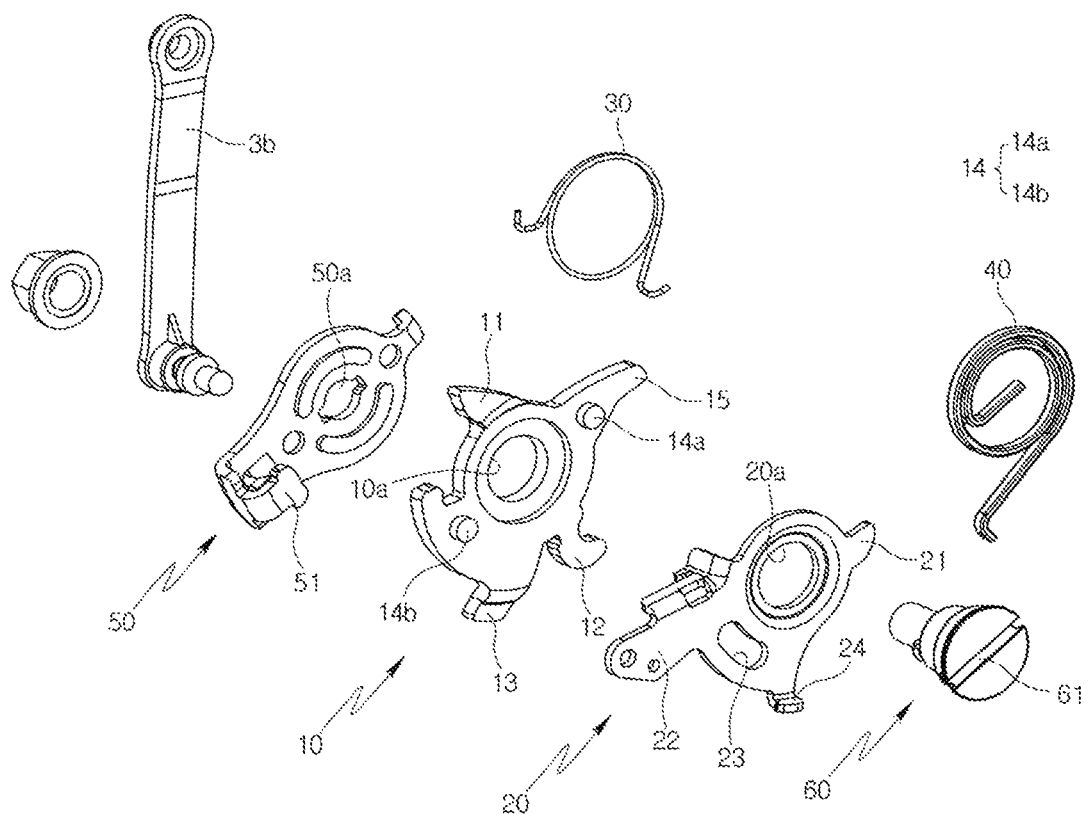
FIG. 7 is an exploded perspective view showing main components in order to illustrate the coupling relationship between the detailed components of the walk-in device shown in FIGS. 5 and 6.

In this case, the cushion frame 1 is provided with a slot-shaped through portion 1a (shown in FIG. 4) in order to guide the movement of the recliner 3 with respect to the walk-in rod 3b during a folding operation. The through portion 1a serves to connect the contact portion 12 of the rotor 10 and one end of the walk-in rod 3b so that they can operate in conjunction with each other, and also servers to accurately guide the movement of the connection portion between the contact portion 12 of the rotor 10 and one end of the walk-in rod 3b along a predetermined trajectory during a conjunctive operation. In other words, the cushion frame 1 serves as a type of partition structure that allows the walk-in rod 3b and the rotor 10 to be disposed on an outer side and an inner side, respectively, around the through part 1a.

The protrusion portion 13 limits the rotation angle of the rotor 10 through contact with the catch portion 51 of the base plate 50 during a walk-in operation, and is configured to protrude radially outward from the rotor.

The embossing portions 14 switch the track locker 4 to a released state through a conjunctive operation with the puller 20 during a walk-in operation, and is configured to protrude outward in a radial direction from the rotor 10.

In other words, the embossing portions 14 are configured to provide a rotational force to the puller 20 for a conjunction operation with the puller 20 during a walk-in operation. For example, the embossing portions 14 may include a first embossing part 14a and a second embossing part 14b that are independently provided in the form of protruding from respective portions radially spaced apart from the rotation center of the rotor 10. In other words, the embossing portions 14 are provided in the form of a plurality of conjunctive operation-type protrusion structures located on portions radially spaced apart from the rotation center of the rotor 10.

Figure 2:
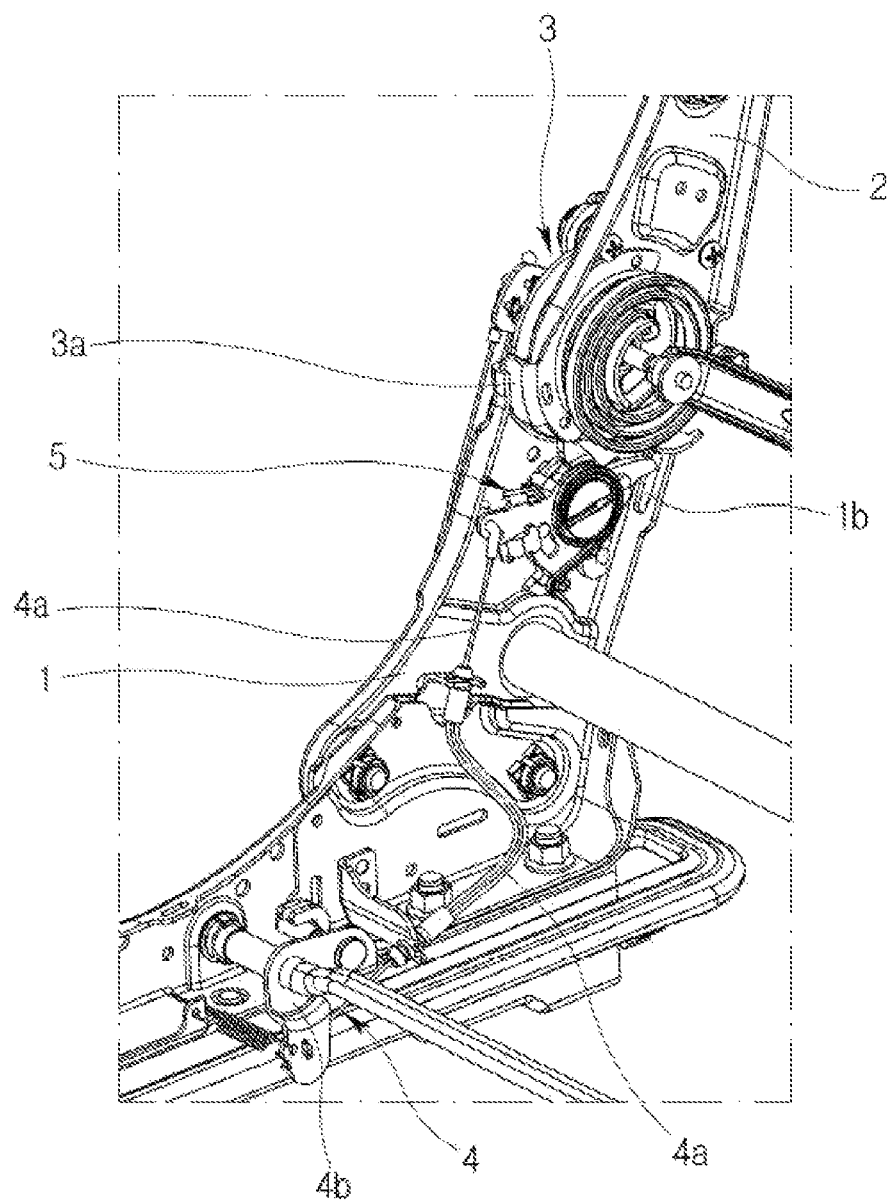
FIG. 2 is an enlarged perspective view of only the main portion of the present invention shown in FIG. 1.
Figure 3:
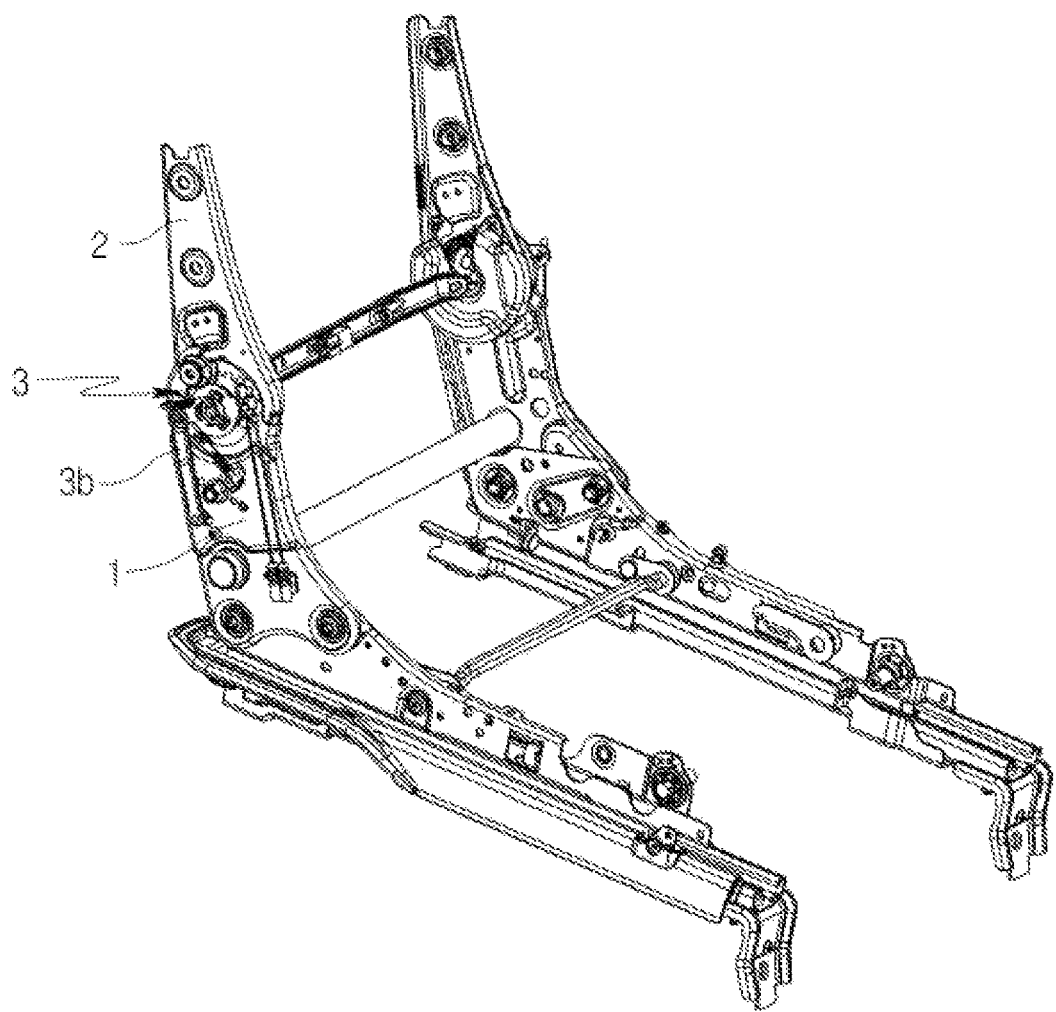
FIG. 3 is a perspective view showing the installation state of a walk-in device for a seat according to an embodiment of the present invention when viewed from the opposite side.

In addition, the rotor 10 further includes the constraint protrusion portion 15 that can be inserted into the reception slit 1b (shown in FIG. 2) of the cushion frame 1 during a walk-in operation and limit the folding angle of the back frame 2 to a set angle through contact with the reception slit 1b.

In other words, the restraint protrusion portion 15 may be inserted into the inside of the reception slit 1b formed in the cushion frame 1 when limiting and maintaining the folding angle of the back frame 2 to a set angle during a walk-in operation. Accordingly, when a user gets on or off a vehicle, it may be possible to apply a strong support force against the load generated by gripping the upper end part of the back frame 2 of the seat. As a result, in spite of the user's load acting on the back frame 2 of the seat during a walk-in operation, the folding angle of the seat may normally be maintained at an initially set angle.

In the walk-in device for a seat according to an embodiment of the present invention, the puller 20 includes a pressure reception portion 21, a mounting portion 22, and a slot portion 23. In addition, the puller 20 is provided with a through hole 20a for axial coupling with the hinge shaft 60 in the central portion thereof. As a result, the puller 20 may set up a single rotation point with respect to the base plate 50 via the hinge shaft 60.

The pressure reception portion 21 operates in conjunction with the first one 14a of the embossing portions 14 of the rotor 10 during a walk-in operation, and is configured to protrude radially outward from the puller 20.

The mounting portion 22 is connected to a walk-in cable 4a configured to release the track locker 4 during a walk-in operation, and is configured to protrude radially outward from the puller 20.

The slot portion 23 allows the independent rotation of only the rotor 10 during a folding operation, and is configured to be opened in an arc shape to accommodate the second embossing portion 14b of the embossing portion 14 so that it can be rotatably by a set angle.

The rotor spring 30 provides an elastic force to the rotor 10 in a return direction during a walk-in operation and a folding operation, and is installed in the state in which both ends thereof are supported between the contact portion 12 of the rotor 10 and the catch portion 51 of the base plate 50.

The puller spring 40 provides an elastic force to the puller 20 in the return direction during a walk-in operation, and is installed in the state in which both ends thereof are supported between the protrusion portion 24 of the puller 20 and the recess portion 61 of the hinge shaft 60.

In this case, although the rotor spring 30 and the puller spring 40 can provide a restoring force to the rotor 10 and the puller 20 in the return direction, the installation locations thereof are not limited to those of the above-described embodiment, but may be implemented in the form of various modified locations.

The base plate 50 rotatably installs the rotor 10 and the puller 20 on the cushion frame 1 of the seat via the single hinge shaft 60, and is provided with a through hole 50a for axial coupling with the hinge shaft 60 in the central portion thereof. In addition, the base plate 50 is provided with a catch portion 51 configured to come into contact with the protrusion 13 of the rotor 10 during a walk-in operation and to limit the rotation angle of the rotor 10.

The hinge shaft 60 sequentially passes through the through hole 10a of the rotor 10, the through hole 20a of the puller 20, and the through hole 50a of the base plate 50, thereby providing a single rotation point to the base plate 50 for the rotor 10 and the puller 20.

As an embodiment of the present invention, in a walk-in operation according to walk-in manipulation and a folding operation according to folding manipulation, the detailed operational relationships between individual components will be described in more detail below.

Walk-In Operation

Figure 8:
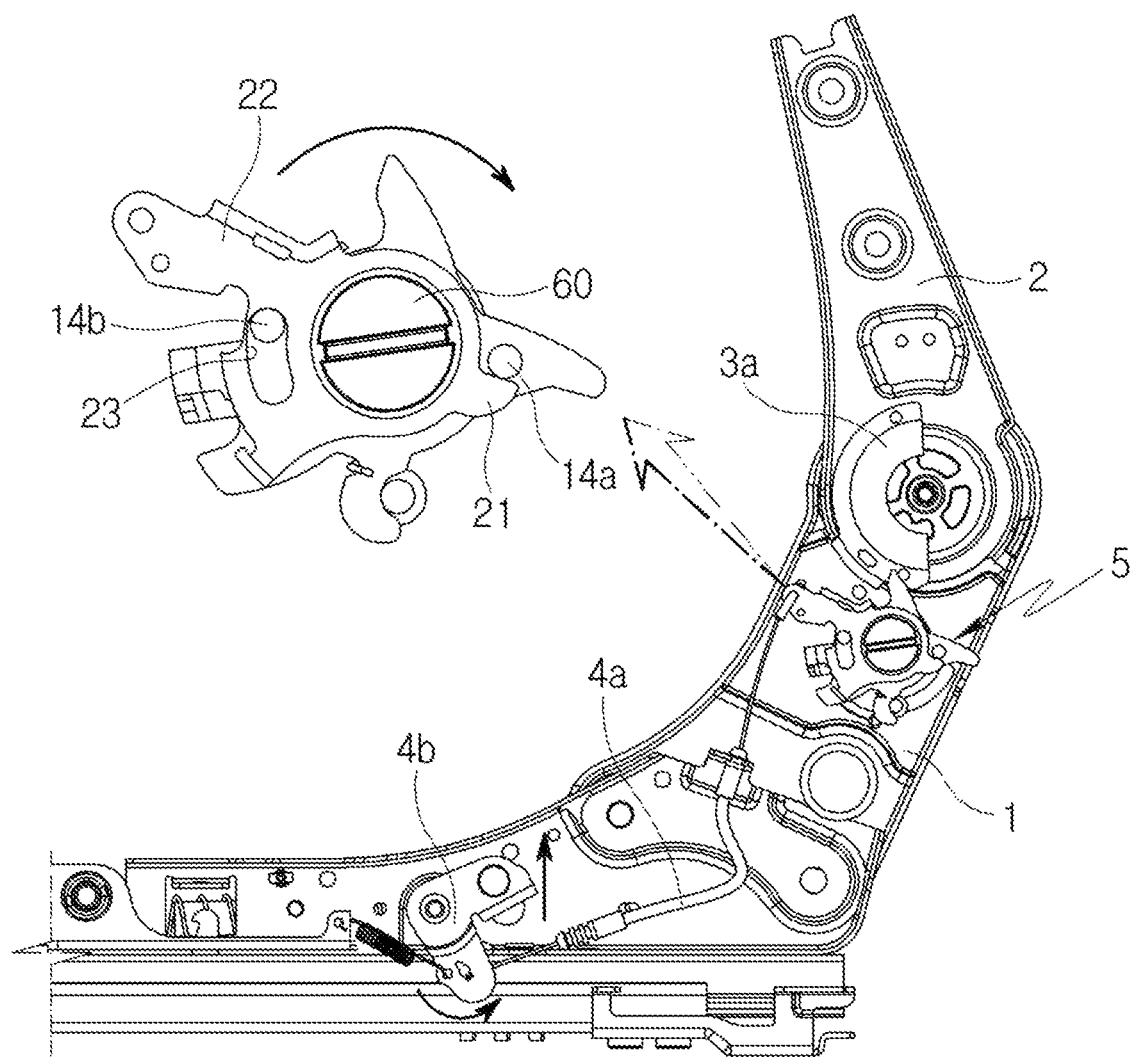
FIG. 8 is a view illustrating a walk-in operating that is performed by walk-in manipulation in a walk-in device for a seat according to an embodiment of the present invention.

A walk-in operating that is performed by walk-in manipulation in the walk-in device for a seat according to the embodiment of the present invention will be described as follows:

Referring to FIG. 8, when the spring hooker 3a of the recliner 3 is rotated counterclockwise by the operation of any one of a manual walk-in lever or an automatic actuator during a walk-in operation, the first embossing portion 14a of the rotor 10 provides a rotational force to the pressure reception portion 21 of the puller 20 and the second embossing portion 14b of the rotor 10 provides a rotational force to the slot portion 23 of the puller 20. Accordingly, both the rotor 10 and the puller 20 are rotated clockwise.

In other words, the rotational force applied by the rotor 10 during the walk-in operation may be stably transmitted to the puller 20 through the contact between the first embossing portion 14a of the rotor 10 and the pressure reception portion 21 of the puller 20 and the contact between the second embossing portion 14b of the rotor 10 and the slot portion 23 of the puller 20. In other words, the rotational force provided from the rotor 10 to the puller 20 during the walk-in operation is smoothly transmitted through the contact between the first embossing portion 14a of the rotor 10 and the pressure reception portion 21 of the puller 20 and the contact between the second embossing portion 14b of the rotor 10 and the slot portion 23 of the puller 20.

In this process, when the walk-in cable 4a fixed to the mounting portion 22 of the puller 20 is pulled and thus a rotational force is transmitted to the walk-in link 4b of the track locker 4, the track locker 4 is switched from a locked state to a released state so that a walk-in operation state in which the seat can move in a front-rear direction can be started. In this case, the inclination angle of the back frame 2 with respect to the cushion frame 1 is switched to the state of being inclined at a predetermined angle toward the front.

In addition, when the walk-in operation is released, the rotor 10 and the puller 20 are rotated counterclockwise by the elastic restoring forces provided by the rotor spring 30 and the puller spring 40, respectively. Accordingly, the rotor 10 and the puller 20 return to their original states, and the track locker 4 is switched from the released state to the locked state.

Furthermore, in the walk-in state, the protrusion portion 13 of the rotor 10 may come into contact with and be supported by the catch portion 51 of the base plate 50, and the contact portion 12 of the rotor 10 may come into contact with and be supported by the walk-in rod 3b that is given a moving force provided by the restoration spring of the recliner 3. Accordingly, the walk-in device 5 according to the present invention may provide a secure support structure of dual stop.

Folding Operation

Figure 9:
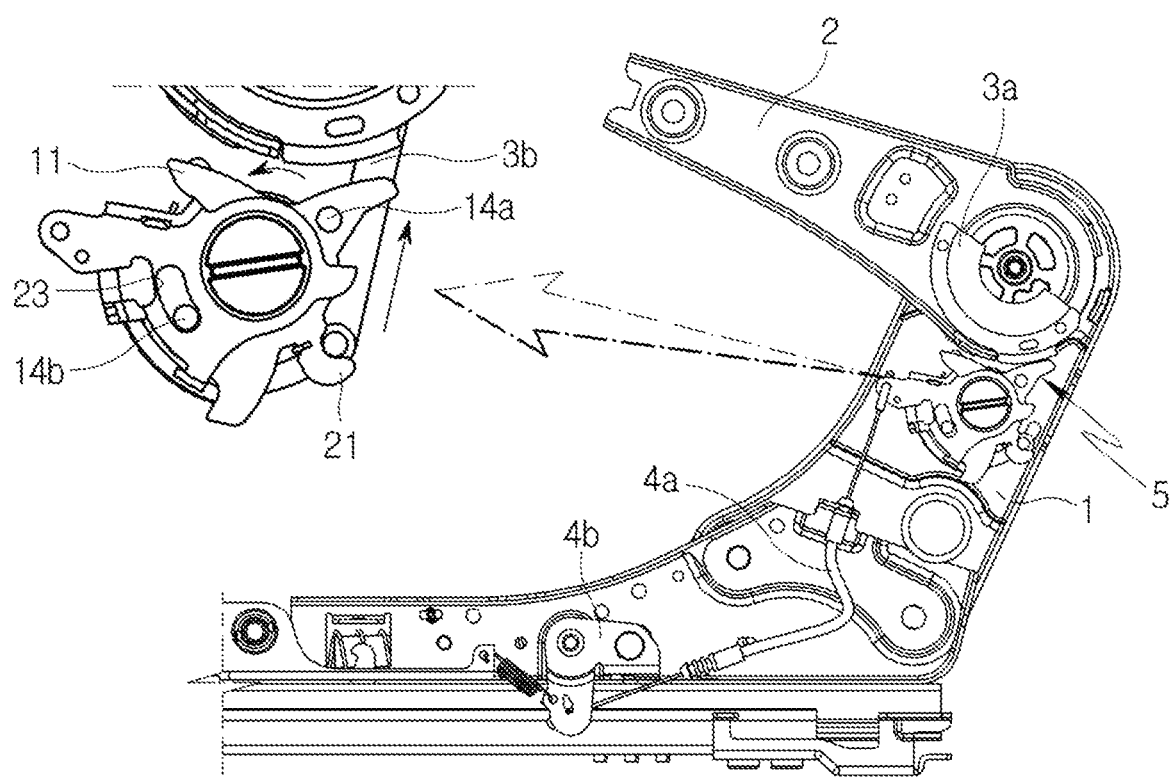
FIG. 9 is a view illustrating a folding operation that is performed by folding manipulation in a walk-in device for a seat according to an embodiment of the present invention.

A folding operation that is performed by folding manipulation in the walk-in device for a seat according to the embodiment of the present invention will be described as follows:

Referring to FIG. 9, when the release cable of the recliner 3 is pulled by the operation of any one of a manual walk-in lever and an automatic actuator during a folding operation, the state of the recliner 3 is gradually switched from a locked state to a released state by the rotation of the release lever. The walk-in rod 3b is pulled in the direction in which it is raised.

In this process, when the walk-in rod 3b is raised, the rotor 10 is rotated counterclockwise by the elastic force provided by the rotor spring 30.

In particular, in this process, the counterclockwise rotation of the rotor 10 does not affect the puller 20, and the independent counterclockwise rotation of only the rotor 10 is performed. This may be possible because the first embossing portion 14a of the rotor 10 is spaced apart from the pressure reception portion 11 of the puller 20 and also the second embossing portion 14b of the rotor 10 may move freely within the slot portion 23.

In addition, in this process, the counterclockwise rotation of the rotor 10 causes the pressure reception portion 11 to rotate counterclockwise at the same time. Accordingly, the counterclockwise rotation by the spring hooker 3a may allow the recliner 3 to be switched to a state in which there is no interference from the pressure reception portion 11 of the rotor 10. This means that the recliner 3 may be smoothly switched from a locked state to a fully released state.

In this case, while only the rotor 10 is rotated counterclockwise according to the release operation of the recliner 3, the second embossing portion 14b may freely be rotated within the slot portion 23. Accordingly, the counterclockwise rotation of the puller 20 is not performed, and thus tension is not applied to the walk-in cable 4a. As a result, the locked state of the track locker 4 may be maintained without change. In this case, the inclination angle of the back frame 2 with respect to the cushion frame 1 is switched to a folded state at an angle of approximately 90 degrees toward the front.

Moreover, when the folding operation is released, the rotor 10 is rotated clockwise by the elastic restoring force provided by the rotor spring 30. Accordingly, the rotor 10 returns to its initial state, and the walk-in rod 3b is lowered back. As a result, the recliner 3 may smoothly be returned from a released state to a locked state.

The walk-in device for a seat according to an embodiment of the present invention may implement both folding and walk-in functions for a seat via a single hinge-type structure using a release lever direct driving scheme, thereby reducing the space occupied by parts, and also improving ease of assembly and reducing manufacturing costs due to a reduction in the number of related parts.

The above description is intended merely to illustrate the technical spirit of the present invention. Those of ordinary skill in the art to which the present invention pertains may make various modifications and variations without departing from the essential characteristics of the present invention. Accordingly, the embodiments disclosed in the present application are not intended to limit the technical spirit of the present invention, but is intended to illustrate the technical spirit of the present invention. The scope of the technical spirit of the present invention is not limited to these embodiments. Therefore, the scope of protection of the present invention should be interpreted by the attached claims, and all technical spirits falling within the range equivalent to the attached claims should be construed as being included in the scope of the present invention.

What is claimed is:

1. A walk-in device for a seat, the walk-in device comprising:
    a rotor configured to operate in conjunction with a recliner during a walk-in operation;
    a puller configured to operate in conjunction with the rotor during the walk-in operation, and to operate only in conjunction with the recliner without operating in conjunction with the rotor during a folding operation;
    a rotor spring configured to provide an elastic force to the rotor in a return direction;
    a puller spring configured to provide an elastic force to the puller in a return direction; and
    a base plate configured to rotatably install the rotor and the puller on a cushion frame of the seat, wherein the rotor and the puller are configured to set up a single rotation point with respect to the base plate via a hinge shaft.

2. The walk-in device of claim 1, wherein the rotor comprises:
    a pressure reception portion configured to receive a rotational force from a spring hooker of the recliner during the walk-in operation;
    a contact portion configured to perform a conjunctive operation through contact with a walk-in rod of the recliner during the folding operation;
    a protrusion portion configured to limit a rotation angle of the rotor through contact with a catch portion of the base plate during the walk-in operation; and
    an embossing portion configured to switch the track locker to a released state through a conjunctive operation with the puller during the walk-in operation.

3. The walk-in device of claim 2, wherein the embossing portion comprises a first embossing portion and a second embossing portion provided at respective portions that are radially spaced apart from a rotation center of the rotor in order to provide a rotational action force to the puller.

4. The walk-in device of claim 2, wherein the rotor further comprises a restraint protrusion portion configured to be inserted into a reception slit of the cushion frame during the walk-in operation and to limit a folding angle of a back frame through contact with the reception slit.

5. The walk-in device of claim 3, wherein the puller comprises:
    a pressure reception portion configured to operate in conjunction with the first embossing portion of the rotor during the walk-in operation; and
    a mounting portion connected to a walk-in cable to release the track locker during the walk-in operation.

6. The walk-in device of claim 5, wherein the puller further comprises a slot portion configured to accommodate the second embossing portion so that the embossing portion can be rotated by a set angle in order to allow rotation of only the rotor during the folding operation.

7. The walk-in device of claim 6, wherein the puller further comprises a protrusion portion configured to support one end of the puller spring.

8. The walk-in device of claim 7, wherein the puller spring is installed such that both ends thereof are supported on the protrusion portion of the puller and a recess portion of the hinge shaft, respectively.

9. The walk-in device of claim 2, wherein the rotor spring is installed such that both ends thereof are supported on the contact portion of the rotor and the catch portion of the base plate, respectively.

* * * * *